United States Patent Office 3,317,576
Patented May 2, 1967

3,317,576
REACTION PRODUCTS OF ANTIMONY HALIDES OR OXIDES WITH THIOGLYCOLLIC MERCAPTO-HYDROXYALKANES
Hugo Malz, Leverkusen, and Wilhelm Göbel, Cologne-Flittard, Germany, assignors to Farbenfabriken Bayer Aktiengesellschaft, Leverkusen, Germany, a German corporation
No Drawing. Filed June 18, 1963, Ser. No. 288,635
Claims priority, application Germany, June 20, 1962, F 37,118, F 37,119
4 Claims. (Cl. 260—446)

This invention relates to the stabilization of chlorine-containing polymers, especially polyvinyl chloride, to satbilizers used therefor and to their production.

It is known that chlorine-containing high molecular weight compounds such as polymers of vinyl chloride and copolymers of vinyl chloride and vinyl acetate or polymers and copolymers of vinylidene chloride and chlorination products of higher or polymeric hydrocarbons, such as chlorinated paraffin or chlorinated natural or synthetic rubber must be protected against undesirable changes produced by the action of heat, light or the atmosphere by the addition of stabilizing substances. Numerous compounds of many different classes of substances have already been proposed as stabilizers, e.g. inorganic compounds such as oxides, hydroxides, carbonates, phosphates or phosphites of alkali metals and alkaline earth metals as well as of heavy metals such as zinc, cadmium or lead. In addition, organic metal compounds, particularly those of tin, and organic compounds such as carboxylic acid hydrazides, phosphoric acid esters and phosphoric acid hydrazides and epoxy compounds are widely used as stabilizers on a technical scale. A stabilizer should as far as possible be suitable for many types of the above mentioned groups of polymers, should at the same time stabilize against heat and light and the action of the atmosphere, should not make it more difficult to work up the material and should be compatible with additives (e.g. plasticizers). Its physiological properties are also important.

It has now been found that organic antimony compounds which have been obtained by reacting antimony trihalides or antimony trioxide with thioglycollic acid and/or 1-mercapto-2-hydroxyalkanes in an aqueous medium and which contain in the bound form, per Sb atom, either 2 mols of thioglycollic acid or 2 mols of mercaptoalkanol or 1 mol each of thioglycollic acid and mercaptoalkanol are very suitable for use as stabilizers for chlorine-containing polymers.

The compounds used according to the invention may be prepared, for example, by reacting antimony-(III)-compounds with thioglycollic acid or with 1-mercapto-2-hydroxyalkanes, or with mixtures of these two compounds. When 1-mercapto-2-hydroxylalkanes are used, the reaction is preferably carried out in an aqueous solution in the neutral or alkaline range, and antimony trioxide may advantageously be used as the antimony compound. The general reaction with thioglycollic acid, however, may also be carried out in an acid medium and/or with the use of antimony trichloride.

The reaction components are advantageously used in such quantities that at least approximately 2 molecules of the other reaction components are used for each antimony atom. When a mixture of 1-mercapto-2-hydroxyalkanes and thioglycollic acid is used, these two components are preferably used in the molar ratio of 1:1. Although, in principle, the reaction may be carried out in the temperature range of 0 to 100° C., it is preferable to employ a temperature range of 60 to 100° C. Insoluble antimony trioxide, which may in some cases be used as starting material, is gradually converted in a neutral medium to a compound which is soluble at first but which begins to crystallize, after a short time, in the form of a colorless precipitate. This precipitate may be isolated and purified by the usual methods. The process according to the invention is advantageously carried out in an aqueous, alkaline medium. The alkalies may be used, for example, in the form of aqueous solutions of alkali metal hydroxide or carbonates. The reaction products may be recovered by the usual methods, e.g. by cooling and acidification with mineral acids, from the clear, alkaline solutions thereby produced. The constitution of the new compounds is not yet known, but analytical findings show that the compounds contain either 2 mols of mercapto alkanol or 1 mol each of mercapto alkanol and thioglycollic acid per antimony atom.

All these new compounds are colorless compounds which crystallize well and have definite melting points, although sometimes, depending on the starting compounds, they may also be obtained in the form of colorless oils which cannot be distilled. The compounds are stable in storage although they gradually turn brown under the action of direct sunlight.

The new compounds are extremely stable to hydrolytic influences and may, for example, partly be recrystallized from hot water.

Compared with known stabilizers, the compounds used in accordance with the invention have the following advantages, among others:

(1) Their stabilizing effect is excellent.
(2) They are highly compatible with all chlorine-containing polymers and with the usual additives (e.g. plasticizers) and can easily be mixed in with them.
(3) They are odorless or almost odorless in themselves and have only slight toxicity in warm-blooded animals, so that there are no objections to their use from a physiological point of view.
(4) The compounds are technically easily accessible and obtainable by simple methods. They may be used either alone or in combination with known stabilizers, and in some cases known stabilizers are considerably improved in their action when present in such combinations.

The stabilizers according to the invention are used in known manner by adding them in quantities of, for example, 0.1 to 5% by weight, preferably 0.3 to 2% by weight, either alone or in mixtures with each other and/or in mixtures with other stabilizers, to the chlorine-containing high molecular weight compounds. The addition of these stabilizers to polymers or copolymers may be effected, for example, during the polymerization or during the subsequent preparation of the mixture, e.g. on a roller.

Suitable high molecular weight compounds for the process of the invention are, for example, polymers of vinyl chloride or vinylidene chloride, 2-chlorobutadiene or copolymers of these compounds with vinyl acetate or chlorine rubber or sulphochlorinated polyethylene.

The excellent stabilizing effect of the class of compounds claimed in the invention will be evident from the following examples. The compounds mentioned may be prepared, for example by the following method:

*Compound A.*—A solution of 18.4 g. of thioglycollic acid and 15.6 g. of mercaptoethanol in about 100 ml. of water is stirred with 29.2 g. of $Sb_2O_3$. When the slightly exothermic reaction has died down, the reaction mixture is rendered alkaline by means of a solution of 8 g. of NaOH in 30 ml. of water, the temperature of the mixture thereby rising to about 60–70° C. The mixture is then heated to about 80–90° C. while stirring, a clear solution being formed which is filtered at about 40 to 50° C. to remove traces of impurities and then acidified with half-concentrated hydrochloric acid at 10–20° C. A colorless crystalline precipitate is formed which is separated by suction filtration and washed with water until neutral.

M.P. after drying on clay; 130° C., after recrystallization from hot water: 138° C. Yield about 40 g.

*Analysis.*—Calculated for $C_4H_7O_3S_2Sb$: C, 16.6%; H, 2.4%; S, 22.2%; Sb, 42.2%. Found: C, 16.8%; H, 2.5%; S, 22.2%; Sb, 41.9%.

*Compound B.*—29.2 g. of $Sb_2O_3$ are stirred into a solution of 31.5 g. of mercaptoethanol in 100 ml. of water. The mixture is then added to a solution of 8 g. of NaOH in 30 ml. of water whereby slight yellow discoloration occurs and the temperature of the mixture rises to about 40° C. The turbid mixture is slowly heated to 75–85° C. while stirring, a substantially clear solution thereby being formed. This solution is filtered at room temperature and then treated with about 20 ml. of concentrated hydrochloric acid and at the same time cooled with ice. The colorless crystals thereby precipitated are removed by suction filtration, washed with water until neutral and dried on clay. M.P. 132–133° C. after recrystallization from isopropanol 133–135° C. Yield about 45 g.

*Analysis.*—Calculated for $C_4H_9O_2S_2Sb$: C, 17.5%; H, 3.3%; S, 23.3%; Sb, 43.3%. Found: C, 17.5%; H, 3.4%; S, 23.2%; Sb, 42.0%.

*Compound C.*—29.2 g. of $Sb_2O_3$ are stirred into a mixture of 16 g. of mercapto ethanol, 18.4 g. of mercaptopropanol and 100 ml. of water. This mixture is then treated with a solution of 8 g. of NaOH in 30 ml. of water and heated to 80 to 90° C. The turbid solution is filtered hot and cooled to about 10° C. with a mixture of ice and water. When the solution is acidified with 20 ml. of concentrated hydrochloric acid, an oil separates which is removed and washed with water. The oil crystallizes when stirred into an acetone/water solution. When redissolved from isopropanol, colorless crystals melting at 100 to 103° C. are obtained.

*Analysis.*—Calculated for $C_5H_{11}O_2S_2Sb$: C, 20.6%; H, 3.81%; S, 22.1%; Sb, 42.2%. Found: C, 20.6%; H, 3.88%; S, 22.2%; Sb, 42.2%.

*Compound D.*—29.2 g. of $Sb_2O_3$ are stirred into a solution of 18.4 g. of thioglycollic acid and 18.4 g. of mercaptopropanol in about 50 ml. of water. The mixture is then treated with a solution of 8 g. of NaOH in 30 ml. of water and heated to about 90° C. The turbid solution is filtered hot, cooled to room temperature with a mixture of ice and water and treated with 20 ml. of concentrated hydrochloric acid. The oil thereby formed is separated, washed with water and crystallized by trituration with an acetone/water solution. Melting point of the colorless crystals 149° C.

The other compounds according to the invention may be prepared in an analogous manner.

The discolorations of the samples given in the examples are indicated by the following numbers:

| | |
|---|---|
| Colorless | 1 |
| Yellowish | 2 |
| Brownish | 3 |
| Yellow, orange | 4 |
| Brown, red brown | 5 |
| Black | 6 |

EXAMPLES

Example 1

Portions of 100 parts by weight of a polyvinyl chloride of K-value 70, prepared by emulsion polymerization, are mixed, in turn, with 1 part by weight of one of the substances (*a–d*) given below by rolling for 10 minutes on mixing rollers heated to 160° C., and the rolled sheets thereby produced are then kept in a heating cupboard heated to 170° C. with circulating hot air. Table 1 gives the discolorations observed after the given times.

The following are added:
(a) Compound A
(b) Compound B
(c) Compound C
(d) Compound D The following are used for comparison:
(e) Phenylurea
(f) Diphenylthiourea
(g) No additive

TABLE 1

| Sample | 10 minutes rolled sheet | Time stored in heating cupboard in minutes | | | | | |
|---|---|---|---|---|---|---|---|
| | | 15 | 30 | 45 | 60 | 90 | 120 |
| a | 1 | 1 | 1 | 1 | 2 | 5 | 6 |
| b | 1 | 1 | 1 | 3 | 5 | 6 | |
| c | 1 | 1 | 1 | 1 | 2 | 5 | 6 |
| d | 1 | 1 | 1 | 1 | 2 | 3 | 5 |
| e | 1 | 1 | 5 | 6 | | | |
| f | 1 | 1 | 4 | 5 | 6 | | |
| g | 5 | 6 | | | | | |
| h | 5 | 6 | | | | | |

Example 2

Each portion of 100 parts by weight of a polyvinyl chloride of K-value 70 prepared by suspension polymerization is mixed with 2 parts by weight of one of substances (*a–e*) given below by rolling for 10 minutes on mixing rollers heated to 170° C., and the rolled sheets are then stored at the same temperature in a heating cupboard heated with circulating air.

Samples of the sheets which have been rolled for 10 minutes are then illuminated for 100 hours with a xenon high pressure lamp ("Xenotest" instrument, original Hanau).

The discolorations observed are shown in Table 2.

The following are added:
(a) Compound B
(b) Compound C

The following are added for comparison:
(c) Barium-cadmium-laurate
(d) Sulphur-containing organo tin compound (9.8% tin, 9.0% sulphur)
(e) Potassium-antimonyl tartrate
(f) Antimony-(III)-triphenolate
(g) No additive The following results are obtained:

TABLE 2

| Sample | 10 minutes rolled sheet | Storage time in heating cupboard in minutes | | | | | | | | | Xenotest, 100 hours |
|---|---|---|---|---|---|---|---|---|---|---|---|
| | | 15 | 30 | 45 | 60 | 90 | 120 | 150 | 180 | 210 | |
| a | 1 | 1 | 1 | 1 | 1 | 1 | 2 | 3 | 5 | 6 | 1 |
| b | 1 | 1 | 1 | 1 | 1 | 1 | 2 | 3 | 5 | 6 | 1 |
| c | 2 | 3 | 3–5 | 5 | 5 | 6 | | | | | 3 |
| d | 1 | 1 | 1 | 1 | 1 | 2 | 2 | 5 | 6 | | 1 |
| e | 5 | 5 | 5 | 5 | 6 | | | | | | 5 |
| f | 5 | 5 | 5 | 5 | 6 | | | | | | 5 |
| g | (¹) | | | | | | | | | | |

¹ Very adhesive after 5 min.

Example 3

Portions of 100 parts by weight of a polyvinyl chloride of K-value 70 prepared by suspension polymerization are treated with 1 part by weight of one of the substances of the invention given below, 3 parts by weight of an epoxidized plant oil being added in each case, and the mixtures are tested as described in Example 2. The results are shown in Table 3.

The following are added:
 (a) Compound A
 (b) Compound B

The following results are obtained:

TABLE 3

| Sample | 10 minutes rolled sheet | Storage in heating cupboard in minutes | | | | | | | | Xenotest, 100 hours |
|---|---|---|---|---|---|---|---|---|---|---|
| | | 15 | 30 | 45 | 60 | 90 | 120 | 150 | 180 | 210 | |
| a | 1 | 1 | 2 | 2 | 2 | 2 | 5 | 6 | | | | 1 |
| b | 1 | 1 | 1 | 2 | 2 | 5 | 6 | | | | 1 |

Example 4

Portions of 60 parts by weight of a polyvinyl chloride of K-value 70 obtained by emulsion polymerization are mixed with 40 parts by weight of dioctylphthalate with the addition of 0.6 parts by weight of Compound A by rolling the components for 10 minutes on mixing rollers heated to 160° C. The rolled sheet is then stored in a heating cupboard heated to 170° C.

Whereas a non-stabilized sample is discolored brown after only 15 minutes storage in the heating cupboard and becomes dark brown after 90 minutes, the foil stabilized by the compound according to the invention shows no discoloration even after 90 minutes.

Even when the sheet stabilized as described above and rolled for 10 minutes is exposed to a xenon high pressure lamp, there is no discoloration after 100 hours.

Example 5

Portions of 60 parts by weight of a polyvinyl chloride of K-value 70, obtained by emulsion polymerization, and 40 parts by weight of diphenyl-cresyl phosphate together with 0.6 part by weight of Compound B are worked up and tested as described in Example 4.

Whereas a non-stabilized sample is colored brown even after 15 minutes storage in a heating cupboard, a foil that has been stabilized with the compound according to the invention is still colorless after 30 minutes in the heating cupboard as well as after 100 hours exposure to light in the Xeno test.

We claim:

1. An organic antimony compound which has been obtained by reacting in an aqueous medium at least one member selected from the group consisting of antimony trihalide and antimony trioxide with at least one member selected from the group consisting of thioglycollic acid and 1-mercapto-2-hydroxyalkane containing from 2 to 3 carbon atoms, said antimony compound containing per antimony atom one member selected from the group consisting of 2 mols of thioglycollic acid, 2 mols of said 1-mercapto-2-hydroxy-alkane and 1 mol each of thioglycollic acid and said 1-mercapto-2-hydroxy-alkane.

2. The compound of claim 1 wherein said reactants are antimony trioxide, thioglycollic acid and 1-mercapto-2-hydroxy ethane.

3. The compound of claim 1 wherein said reactants are antimony trioxide, 1-mercapto-2-hydroxy-ethane and 1-mercapto-2-hydroxy-propane.

4. The compound of claim 1 wherein said reactants are antimony trioxide, thioglycollic acid and 1-mercapto-2-hydroxy-propane.

References Cited by the Examiner

UNITED STATES PATENTS

| 2,480,823 | 9/1949 | Morris et al. | 260—446 |
| 2,885,415 | 5/1959 | Ramsden | 260—429.7 |
| 3,035,076 | 5/1962 | Galliot et al. | 260—446 |

TOBIAS E. LEVOW, *Primary Examiner.*

W. F. W. BELLAMY, *Assistant Examiner.*